(12) United States Patent
Tu et al.

(10) Patent No.: US 10,156,731 B2
(45) Date of Patent: Dec. 18, 2018

(54) PARTIAL RANDOM LASER ILLUMINATION SYSTEM AND DEVICE HAVING A RANDOM PHASE AND AMPLITUDE COMPONENT

(71) Applicant: National Taiwan University, Taipei (TW)

(72) Inventors: Shih-Yu Tu, Taipei (TW); Hoang-Yan Lin, Taipei (TW)

(73) Assignee: NATIONAL TAIWAN UNIVERSITY, Taipei (TW)

(*) Notice: Subject to any disclaimer, the term of this patent is extended or adjusted under 35 U.S.C. 154(b) by 837 days.

(21) Appl. No.: 14/322,090

(22) Filed: Jul. 2, 2014

(65) Prior Publication Data

US 2015/0194783 A1 Jul. 9, 2015

(30) Foreign Application Priority Data

Jan. 3, 2014 (TW) .............................. 103100156 A

(51) Int. Cl.
| G02B 27/48 | (2006.01) |
| H01S 3/106 | (2006.01) |
| H04N 9/31 | (2006.01) |
| H01S 3/08 | (2006.01) |
| H01S 3/0941 | (2006.01) |
| H01S 3/109 | (2006.01) |
| H01S 3/02 | (2006.01) |
| G02B 27/10 | (2006.01) |

(52) U.S. Cl.
CPC .............. *G02B 27/48* (2013.01); *H01S 3/106* (2013.01); *H04N 9/3161* (2013.01); *G02B 27/1006* (2013.01); *H01S 3/025* (2013.01); *H01S 3/08* (2013.01); *H01S 3/09415* (2013.01); *H01S 3/109* (2013.01); *H01S 2301/02* (2013.01)

(58) Field of Classification Search
CPC .. G02B 27/48; G02B 27/1006; H04N 9/3161; H01S 3/106; H01S 3/08; H01S 3/09415; H01S 3/109; H01S 2301/02; H01S 3/025
See application file for complete search history.

(56) References Cited

U.S. PATENT DOCUMENTS

| 2003/0235228 A1* | 12/2003 | Bacher | H01S 3/08059 372/70 |
| 2010/0141898 A1* | 6/2010 | Moussa | G02B 27/01 353/38 |
| 2013/0100525 A1* | 4/2013 | Chiang | G02B 21/082 359/385 |
| 2013/0300997 A1* | 11/2013 | Popovich | G02B 27/48 349/201 |

* cited by examiner

*Primary Examiner* — Xinning Niu
(74) *Attorney, Agent, or Firm* — Bacon & Thomas, PLLC

(57) ABSTRACT

The present invention provides a partial random laser illumination device having a random phase and amplitude component, comprising: a gain medium, a pump source, a highly reflective mirror, and a random phase and amplitude component. The pump source excites electrons in the gain medium from a low energy level to a high energy level. The highly reflective mirror is passed through by an amplified laser beam emitted by the gain medium. The random phase and amplitude component is disposed between the gain medium and the highly reflective mirror, and is passed through by the amplified laser beam emitted by the gain medium.

12 Claims, 17 Drawing Sheets

PARTIAL RANDOM LASER ILLUMINATION SYSTEM AND DEVICE HAVING A RANDOM PHASE AND AMPLITUDE COMPONENT

BACKGROUND OF THE INVENTION

Field of the Invention

The present invention relates to a laser illumination device, and more particularly, to a partial random laser illumination system and device having a random phase and amplitude component for speckle suppression.

Description of the Prior Art

A laser projection system using a conventional high-coherence laser source generally causes laser speckle patterns on a rough screen surface to which the laser beam is projected. Laser speckle will degrade the image contrast and may irritate the eyes of the observer. To address this problem, one prior art approach to reducing laser speckle is to vibrate a ground-glass plate. Although this known technique can reduce laser speckle effectively, the light source forms a surface light source, which makes the laser source unable to be focused on one spot. In other words, the diffuser used in this technique affects the beam divergence angle. The divergence angle of the output laser beam cannot remain a small one (a divergence angle of about ±20 degree), and the resulted transmittance is only 50%, wasting considerable light energy. In view of the problems described, the above technique can be applied to projection displays based on LCOS (liquid crystal on silicon) or DLP (digital light processing) technologies only, but not to MEMS (micro-electro-mechanical system) devices that require small divergence angles and small light spots.

Another prior art approach employs the technique of vibrating periodic diffractive optical elements to reduce laser speckle. This technique can be applied to MEMS devices; however, the technique requires complicated design of optical elements and perfectly periodic structures, resulting in production difficulties as well as high costs. Yet another prior art approach employs random lasers to address the laser speckle problem. However, the low spatial coherence of a random laser makes it hard to focus the laser source on one spot perfectly.

SUMMARY OF THE INVENTION

In view of the above problems related to prior art approaches, an object of the present invention is to provide a partial random laser illumination system/device having a random phase and amplitude component. The system/device of the present invention can reduce the speckle contrast to lower than 8.5% while remaining a small divergence angle and high transmittance. The system/device of the present invention allows laser beams to achieve long distance illumination (e.g., for a distance of several meters or kilometers). Also, the present invention can be applied for use in LCOS, DLP, and micro-electro-mechanical systems, or other scanning projection systems.

According to the object of the present invention, there is provided a partial random laser illumination device having a random phase and amplitude component, comprising: a gain medium, a pump source, a highly reflective mirror, and a random phase and amplitude component. The pump source excites electrons in the gain medium from a low energy level to a high energy level. The highly reflective mirror is passed through by an amplified laser beam emitted by the gain medium. The random phase and amplitude component is disposed between the gain medium and the highly reflective mirror, and is passed through by the amplified laser beam emitted by the gain medium.

In accordance with the present invention, the random phase and amplitude component is a phase-only random phase and amplitude component, a scattering random phase and amplitude component, or a combination thereof; the random phase and amplitude component may also be a diffuser, a diffractive optical element, a microlens, or combinations thereof. The gain medium has a highly-reflective surface and an anti-reflective surface. The pump source emits pump light into the highly-reflective surface, and the amplified laser beam is emitted from the anti-reflective surface. The random phase and amplitude component and a direction perpendicular to the amplified laser beam forms an angle of near ±0 to near ±90 degrees. Preferably, the random phase and amplitude component reflects part of the amplified laser beam to the gain medium.

In accordance with the present invention, the partial random laser illumination device further comprises a vibrating component vibrating the random phase and amplitude component back and forth. The vibrating direction is substantially perpendicular to the amplified laser beam or forms an angle of near 0-45 degrees with the amplified laser beam. The vibrating component is selected from a voice coil motor, a magnetically driven element, an electrically driven element, a light-driven element, a sound-driven element, a piezoelectric element, and combinations thereof.

In accordance with the present invention, the partial random laser illumination device further comprises one or more light conversion elements disposed between the gain medium and the random phase and amplitude component, such that the light conversion elements are passed through by the amplified laser beam emitted by the gain medium. Preferably, a converging lens is disposed between the light conversion elements and the random phase and amplitude component, such that the laser beam passes through the converging lens. The light conversion element is selected from a linear element and a nonlinear element; the light conversion element may be one of a frequency doubling element, a sum-frequency generation element, a difference-frequency generation element, and/or other conversion elements.

In accordance with the present invention, the partial random laser illumination device further comprises one or more extra random phase and amplitude components disposed between the gain medium and the highly reflective mirror, such that the laser beam passes through the extra random phase and amplitude components.

In accordance with the present invention, the partial random laser illumination device further comprises a converging lens disposed between the gain medium and the random phase and amplitude component, such that the laser beam passes through the converging lens.

According to the object of the present invention, there is also provided a partial random laser illumination system having a random phase and amplitude component, comprising: a laser illumination device emitting a laser beam to a projection target; and a random phase and amplitude component disposed between the laser illumination device and the projection target, the random phase and amplitude component being passed through by the laser beam. Preferably, the random phase and amplitude component reflects part of the laser beam to the laser illumination device.

In accordance with the present invention, the random laser illumination system further comprises a diverging lens and a converging lens. The diverging lens is disposed between the random phase and amplitude component and the laser illumination device, and the converging lens is disposed between the random phase and amplitude component and the projection target. The laser beam passes through the diverging lens and the converging lens.

In accordance with the present invention, the random laser illumination system further comprises one or more extra random phase and amplitude components disposed between the random phase and amplitude component and the projection target, such that the laser beam passes through the extra random phase and amplitude components.

In accordance with the present invention, the random laser illumination system further comprises one or more extra laser illumination devices. The laser illumination device and the extra laser illumination devices emit laser beams to a cross dichroic prism to generate a multi-wavelength random laser source, such that the multi-wavelength random laser source passes through the random phase and amplitude component and is projected on the projection target.

In accordance with the present invention, the random laser illumination system further comprises one or more light conversion elements disposed between the laser illumination device and the random phase and amplitude component, such that the laser beam passes through the light conversion elements. Alternatively, the light conversion elements are disposed between the random phase and amplitude component and the projection target, such that the laser beam passes through the light conversion elements.

According to the object of the present invention, there is further provided a partial random laser illumination system having a random phase and amplitude component, comprising: a laser illumination device emitting a laser beam to a projection target; and a plurality of light conversion modules, each light conversion module comprising a random phase and amplitude component and a light conversion element, the light conversion modules being disposed between the laser illumination device and the projection target and passed through by the laser beam.

According to the object of the present invention, preferably, the above-described partial random laser illumination device may be integrated into the partial random laser illumination system. Thus, the partial random laser illumination system comprises: a partial random laser illumination device according to claim 1 of the present invention; and a random phase and amplitude component disposed between the partial random laser illumination device and a projection target, the random phase and amplitude component being passed through by the laser beam. Preferably, the partial random laser illumination system further comprises one or more light conversion elements.

As stated above, the partial random laser illumination system/device of the present invention can reduce the speckle contrast to lower than 8.5% while remaining a small divergence angle and high transmittance. The present invention can be applied for use in LCOS systems, micro-electromechanical systems that require small laser light spots, or other scanning projection systems.

DETAILED DESCRIPTION OF THE PREFERRED EMBODIMENTS

Figure 1:
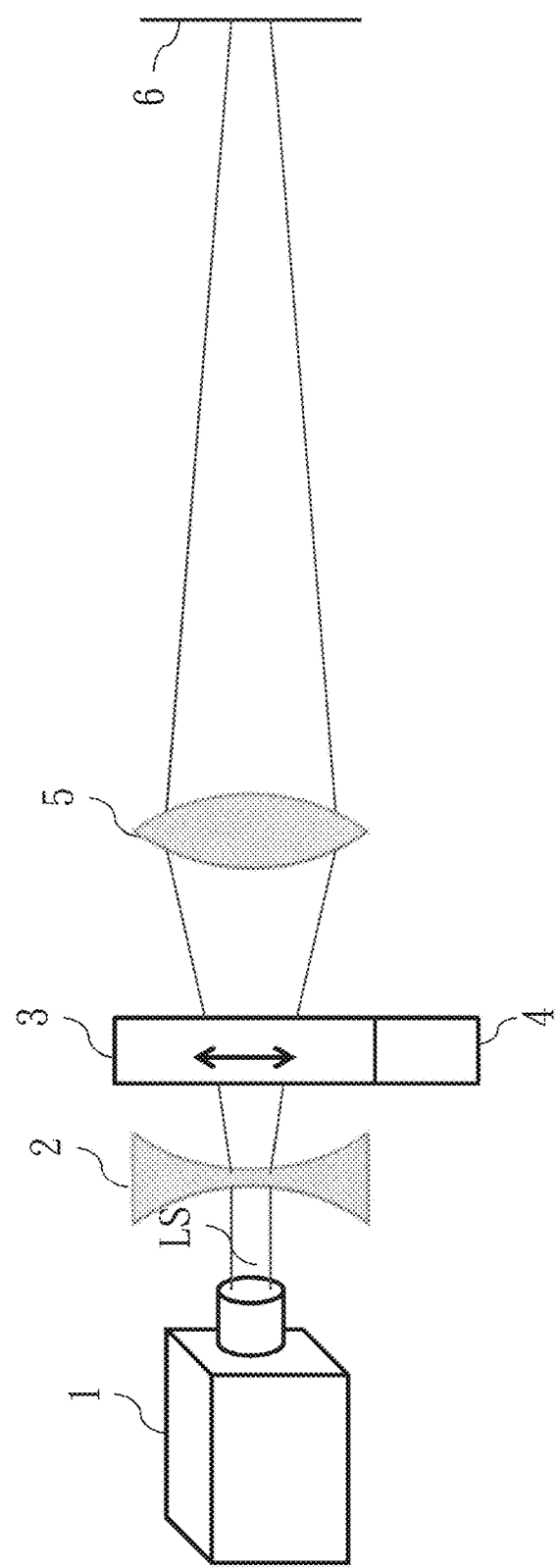
FIG. 1 is a schematic view of a partial random laser illumination system having a random phase diffuser in accordance with a first embodiment of the present invention.

The present invention now will be described more fully hereinafter with reference to the accompanying drawings, in which preferred embodiments of the invention are shown. Numerals mentioned in the following description refer to those shown in the drawings. It should be noted that the words "comprising" or "including" used in the description shall be interpreted as open-ended terms with the meaning of "including but not limited to." Moreover, those of ordinary skill in the art should understand that, there may be different terms designating the same technical subject matter. Therefore, technical subject matters that are of the same technical field and similar in terms of functions to those mentioned in the following description should also be included in the scope of the present application.

FIG. 1 is a schematic view of a partial random laser illumination system in accordance with a first embodiment of the present invention, with the system having a random phase and amplitude component outside the cavity. As FIG. 1 shows, a laser illumination system according to the present invention comprises a laser illumination device 1, a diverging lens 2, a random phase and amplitude component 3, a voice coil motor (VCM) 4, and a converging lens 5. The laser illumination device 1 may be a conventional laser device that generates and emits laser beams. Generally, this laser illumination device includes a pump source (common pump sources include semiconductor lasers, laser diodes, or other electron pumping sources) that can excite electrons from a low energy level to a high energy level. Through the gain medium and the resonant cavity, the stimulated light is amplified for many times to achieve energy amplification; the amplified light is then emitted by the laser illumination device 1 and becomes the laser beam LS.

The laser beam LS passes through the diverging lens 2, and then, the diverged laser beam enters the random phase and amplitude component 3. The diverging lens 2 can diverge the laser beam LS and is preferably a concave lens. The random phase and amplitude component 3 may be of a phase-only type or a scattering type. The random phase and amplitude component 3 may form a small angle of near ±0 to near ±5 degrees with the direction perpendicular to the laser beam LS. The angle may even be extended to near ±90 degrees, and the angle will have different speckle reduction performances at different degrees. When the laser beam LS passes through the random phase and amplitude component 3, the laser beam LS will interact with the component 3 and physical phenomena, including at least one of interference, diffraction, scattering, diffusion, or combinations thereof, etc., will occur, and the random phase and amplitude distribution information is temporally and spatially loaded to the propagating beam. The result is that the random phase and amplitude component 3 causes a re-distribution of the phase and amplitude of the laser beam LS in spatial and temporal coordinates. The component is therefore referred to as random phase and amplitude component, for it is able to cause re-distribution of the phase and amplitude of the laser beam randomly. Thereafter, the laser beam LS passes through the random phase and amplitude component 3 and enters the converging lens 5; thereafter, the laser beam LS passes through the converging lens 5 and is projected on the surface of the projection target 6, wherein the converging lens 5 is preferably a convex lens. In other words, the random phase and amplitude component 3 is disposed between the diverging lens 2 and the converging lens 5. After the laser beam LS is emitted by the laser illumination device 1, it sequentially passes through the diverging lens 2, the random phase and amplitude component 3 and the converging lens 5, and is finally projected on the surface of the projection target 6. Preferably, after the laser beam LS passes through the converging lens 5, the laser beam LS is focused to a point and projected on the surface of the projection target 6. As such, by means of the random phase and amplitude component 3, the laser illumination system of the present invention can reduce speckle noise of the laser beam LS effectively, and generates a partial random laser illumination source. The simple mechanism for forming the partial random laser source is explained as follows. When the laser beam passes through the static random phase and amplitude component, the laser beam will load the random phase and amplitude of the component into it, whereby at least one of the optical interactions including interference, diffraction, scattering, diffusion, etc., will occur. As a result, the phase and amplitude will undergo re-distribution in the spatial and temporal coordinates to achieve speckle reduction. When vibrating the random phase and amplitude component, the spatial distribution of the speckles will be changed along with the changed position of the vibrated component 3. Within a specified period of time, the laser speckles will be re-distributed to cover the illuminated surface evenly, and better speckle reduction performance is thus achieved. Since the original laser is itself phase-coherent, the external factors will change its phase and amplitude distribution in space and time. A laser source with partially random distribution of phase and amplitude is thus generated, and is referred to here as a partial random laser source. It does not completely change but partially changes the spatial coherence and temporal coherence of the original laser light. Therefore, the generated partial random laser source can still retain some of the characteristics, such as those related to the propagation, bandwidth, collimation and focusing, of the original laser light.

As the laser beam LS enters the random phase and amplitude component 3, the phase and amplitude distribution of the laser light in spatial and temporal coordinates will be re-distributed. If the re-distribution occurs in a slower speed, the spatial and temporal coordinates will not be totally destroyed. Thus, the laser beam LS past the component 3 can maintain some of the original phase and amplitude properties, and have partial spatial coherence, partial temporal coherence, partial random phase distribution, and/or partial random amplitude distribution which is called "partial random". The simple mechanism for forming the partial random laser source is explained as follows. When the laser beam passes through the static random phase and amplitude component 3, the laser beam LS will load the random phase and amplitude of the component into it, whereby at least one of the optical interactions including interference, diffraction, scattering, diffusion, etc., will occur. As a result, the phase and amplitude will undergo re-distribution in the spatial and temporal coordinates, generating a partial random laser and achieving speckle reduction.

To achieve more noticeable results, it is preferable that a VCM 4 is used to vibrate the random phase and amplitude component 3 back and forth of the present invention. The vibrating direction is substantially perpendicular to the laser beam LS. Vibrating the random phase and amplitude component 3 will cause the phase and amplitude of the laser beam undergo re-distribution in the spatial and temporal coordinates. When the random phase and amplitude component 3 is vibrated, the spatial distribution of the speckles will be changed along with the changed position of the vibrated component 3. Within a specified period of time, the laser speckles will be re-distributed to cover the illuminated surface evenly. A partial random laser with temporal and spatial variation is generated, and better speckle reduction performance is achieved. Since the original laser is itself phase-coherent, the external factors will change its phase and amplitude distribution in space and time. A laser source with partially random distribution of phase and amplitude is thus generated, and is referred to here as a partial random laser source. It does not completely change but partially changes the spatial coherence and temporal coherence of the original laser light. Therefore, the generated partial random laser source can still retain some of the characteristics, such as those related to the propagation, bandwidth, collimation and focusing, of the original laser light. Moreover, a person of ordinary skill in the art should understand that although the VCM 4 is used as a vibrating component in an embodiment, other components that can achieve the same or similar vibrating results as the VCM 4 may be used in practice. The use of the VCM 4 here is exemplary and is not intended to limit the present invention.

Figure 2:
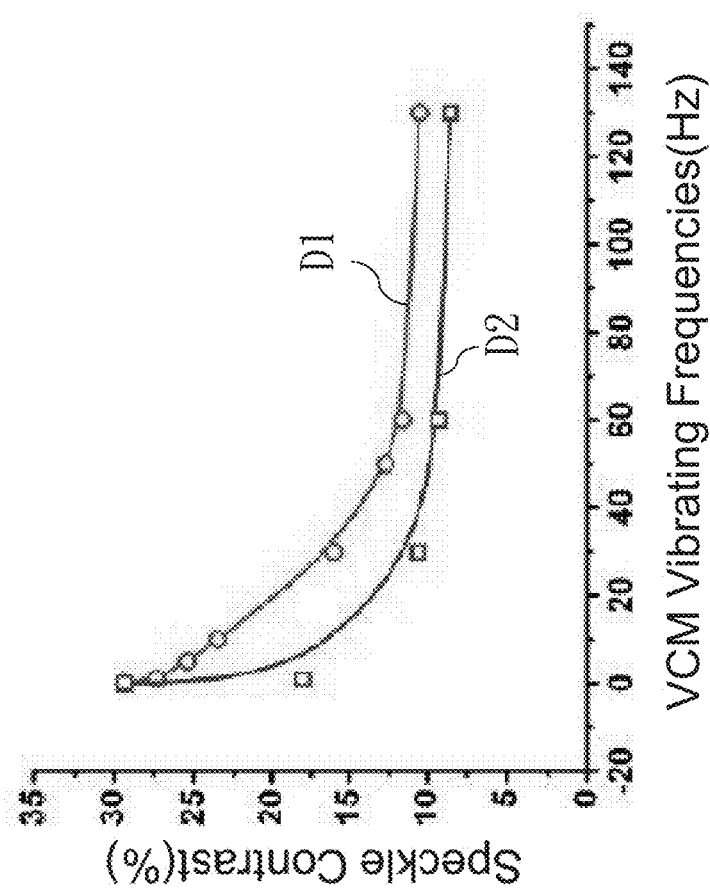
FIG. 2 is a diagram showing the speckle reduction results in relation to the VCM vibrating frequencies in accordance with the present invention.

By vibrating the random phase and amplitude component 3 with the VCM 4, the speckle noise of the partial random laser illumination system can be effectively reduced. FIG. 2 is a diagram showing the speckle reduction results in relation to the VCM vibrating frequencies in accordance with the present invention. For the upper curve D1, the random phase and amplitude component 3 has a small angle of near 1.0 degree with the perpendicular direction of the laser beam LS. For the lower curve D2, the random phase and amplitude component 3 is perpendicular to the laser beam LS. As shown in FIG. 2, whether the random phase and amplitude component 3 has a small angle with the perpendicular direction of the laser beam LS or not, the speckle noise ratio of the laser beam LS (the speckle contrast) is gradually reduced from 30% to 10-15% as the VCM 4 is added to vibrate the random phase and amplitude component 3 with increasing vibrating frequencies (from 0 Hz to about 130 Hz). Clearly, the partial random laser illumination system having a random phase and amplitude component of the present invention can effectively reduce laser speckle noise of the laser beam LS. In addition, the VCM 4 used in this invention may be a compact device that requires low voltage. The VCM 4 may have a size of 0.8 $cm^3$ or smaller, and a voltage of 5V or smaller. Thus, the partial random laser illumination system having a random phase and amplitude component according to the present invention can operate with a low driving voltage and remain compact in size.

The above-described partial random laser illumination system having a random phase and amplitude component can be applied to RGB laser illumination systems. Moreover, the partial random laser illumination system according to the present invention may be applied to illumination systems employing light of a wide range of wavelengths, such as UV light, visible light, near-infrared light or even far-infrared light. Further, the present invention may be applied to laser illumination systems employing quasi-continuous waves or pulse waves other than continuous-wave laser illumination systems, so as to form a novel system.

To achieve more noticeable results, it is preferable that the structure of the random phase and amplitude component 3 has a designed pattern to achieve a better speckle reduction performance. The distribution of this designed pattern may be one of periodic, partially periodic, or random. The structure size of the designed pattern on the random phase and amplitude component may be range from nanoscale to micron-scale; it may be ranged from a scale smaller than 10 um to a scale greater than 150 um or smaller structure size or larger structure size. With the above feature, the partial random laser illumination system having a random phase and amplitude component according to the present invention may be used in imaging systems or microscope systems. The simple mechanism for re-distribution of the speckle pattern is explained as follows. When the laser beam passes through the random phase and amplitude component, the laser beam will load the random phase and amplitude of the component into it, whereby at least one of the optical interactions including interference, diffraction, scattering, diffusion, etc., will occur. As a result, the phase and amplitude will undergo re-distribution in the spatial and temporal coordinates.

From the above, it can be seen that by arranging the diverging lens 2, the random phase and amplitude component 3 (preferably vibrated back and forth by the VCM 4), and the converging lens 5 between the laser illumination device 1 and the projection target 6, the resulted partial random laser illumination system according to the present invention can effectively reduce the speckle noise of the laser beam LS. Since the diverging lens 2, the random phase and amplitude component 3, the VCM 4, and the converging lens 5 are disposed outside the laser illumination device 1, the system according to the present invention can be used with all types of the laser illumination device 1 without affecting their existing structures, while reducing the speckle noise of the laser beam effectively.

Figure 3:
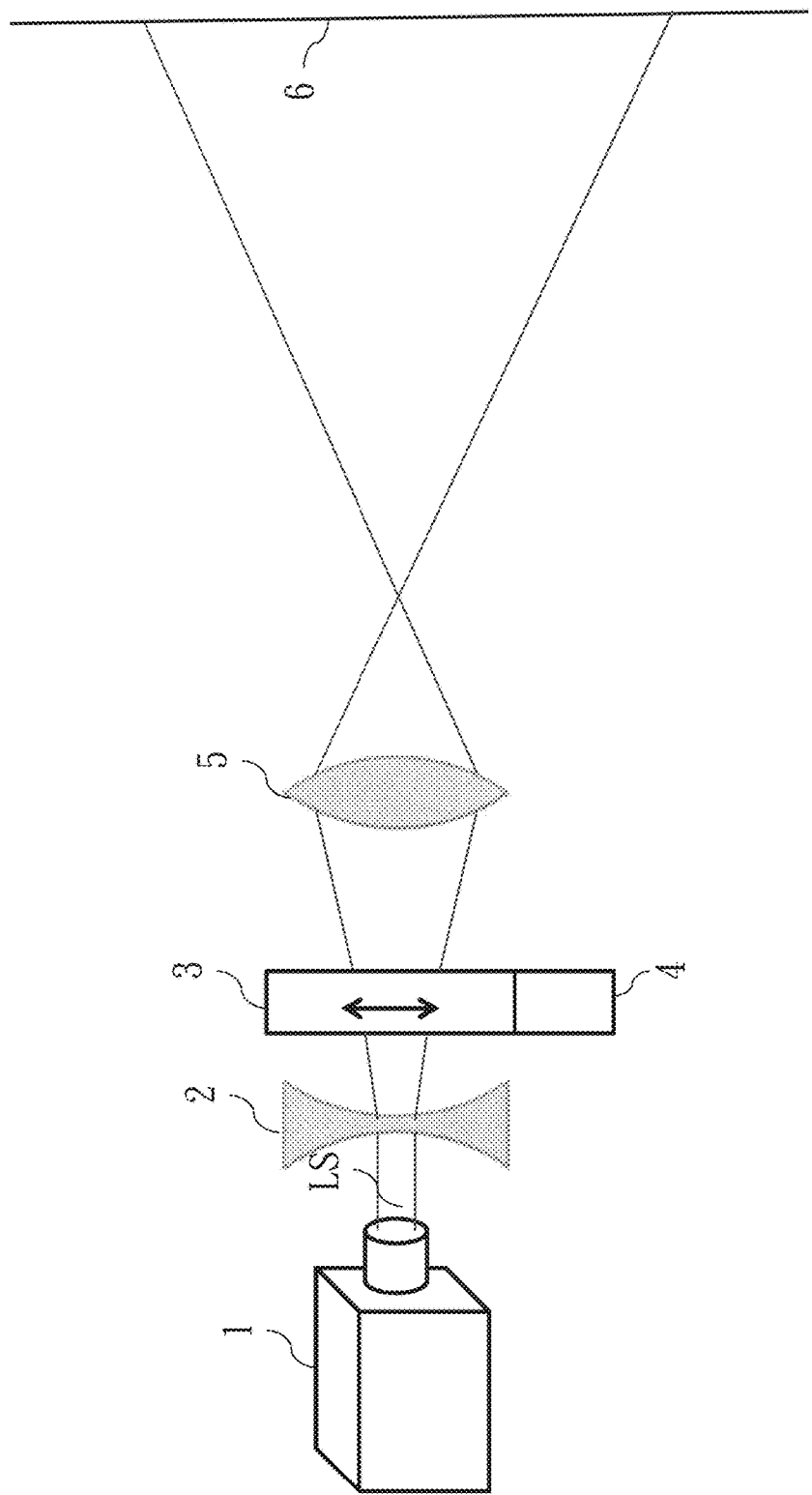
FIG. 3 is a schematic view of a partial random laser illumination system having a random phase and amplitude component in accordance with a second embodiment of the present invention.

The laser illumination system according to the present invention may have many other possible embodiments. FIG. 3 is a schematic view of a partial random laser illumination system having a random phase and amplitude component in accordance with a second embodiment of the present invention. As FIG. 3 shows, with the diverging lens 2 and the converging lens 5 provided in the system, the area of light entering the random phase and amplitude component may be increased to improve the speckle reduction performance. The system can be used for speckle suppression with point light sources or surface light sources.

Figure 4:
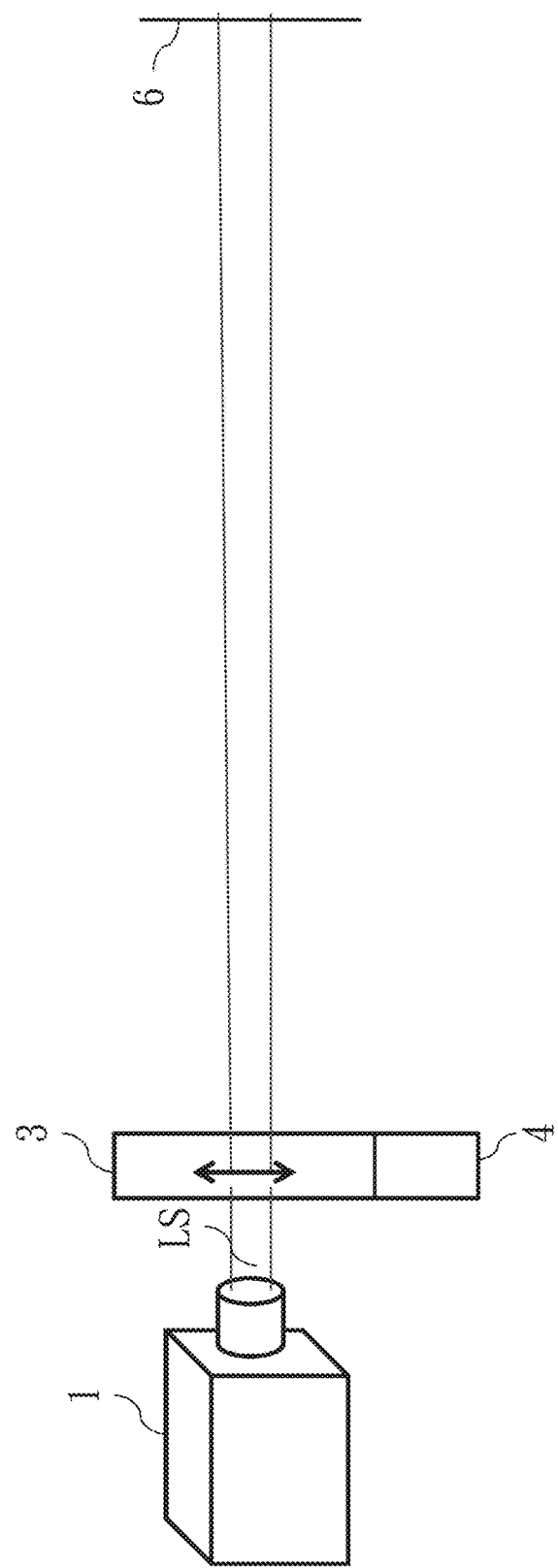
FIG. 4 is a schematic view of a partial random laser illumination system having a random phase and amplitude component in accordance with a third embodiment of the present invention.

In fact, the partial random laser illumination system having a random phase and amplitude component according to the present invention is capable of reducing speckles even without the diverging lens 2 and the converging lens 5. FIG. 4 is a schematic view of a partial random laser illumination system having a random phase and amplitude component in accordance with a third embodiment of the present invention. As FIG. 4 shows, as long as the laser beam LS emitted by the laser illumination device 1 passes through the random phase and amplitude component 3, the partial random laser source generated by the laser illumination system of this invention still shows the speckle reduction capability. Thus, providing lens sets to the system is only a preferred embodiment rather than an element limiting the present invention.

Figure 5:
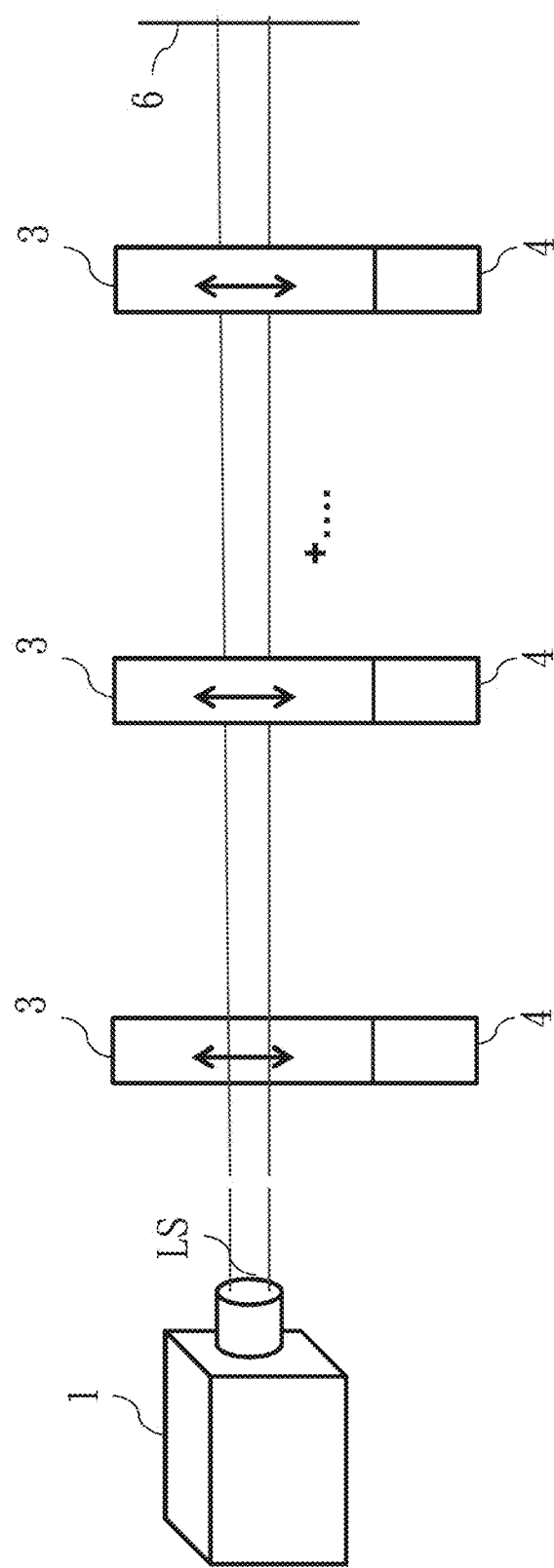
FIG. 5 is a schematic view of a partial random laser illumination system having a random phase and amplitude component in accordance with a fourth embodiment of the present invention.

Further, the laser illumination according to the present invention may comprise more than one random phase and amplitude components, such that the laser beam LS passes through the plurality of random phase and amplitude components to improve the speckle reduction performance of the system. FIG. 5 is a schematic view of a partial random laser illumination system having a random phase and amplitude component in accordance with a fourth embodiment of the present invention. As FIG. 5 shows, the system may comprise a plurality of random phase and amplitude components 3 disposed between the laser illumination device 1 and the projection target 6 (or in other words, extra random phase and amplitude components are disposed between the existing random phase and amplitude component and the projection target). The laser beam LS can pass through the plurality of random phase and amplitude components, and the speckle reduction performance of the system is considerably improved. The laser illumination system may also comprise VCMs 4 arranged for vibrating each of the random phase and amplitude component 3 to enhance speckle reduction.

Figure 6:
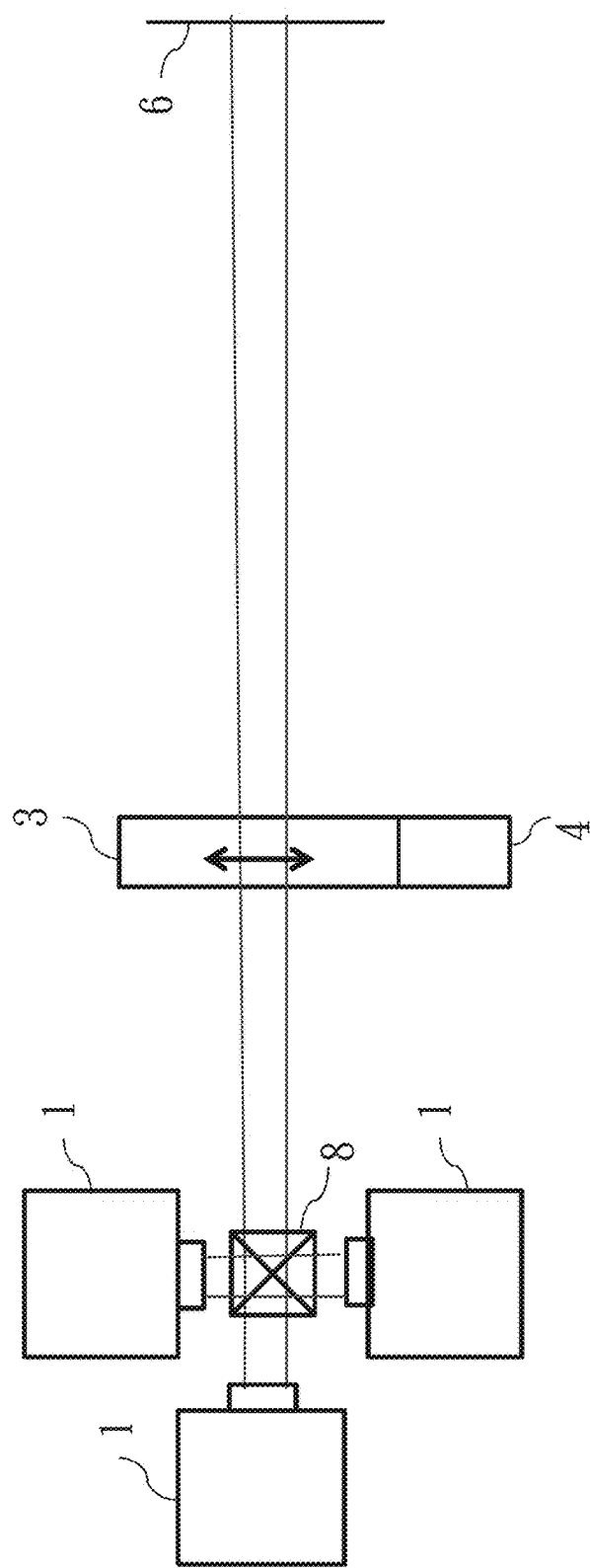
FIG. 6 is a schematic view of a partial random laser illumination system having a random phase and amplitude component in accordance with a fifth embodiment of the present invention.

In another embodiment of the present invention, the system comprises more than one laser illumination devices that emit laser beams toward a cross dichroic prism together. FIG. 6 is a schematic view of a partial random laser illumination system having a random phase and amplitude component in accordance with a fifth embodiment of the present invention. As FIG. 6 shows, a plurality of laser illumination devices 1 emit laser beams to a cross dichroic prism 8, where the multi-wavelength laser sources will be merged. The resulted multi-wavelength laser source coming from the cross dichroic prism 8 then passes through the random phase and amplitude component 3, which allows the speckle to be suppressed to generate a partial random multi-wavelength laser source. Speckle reduction is thus realized for multi-wavelength laser sources.

Figure 7:
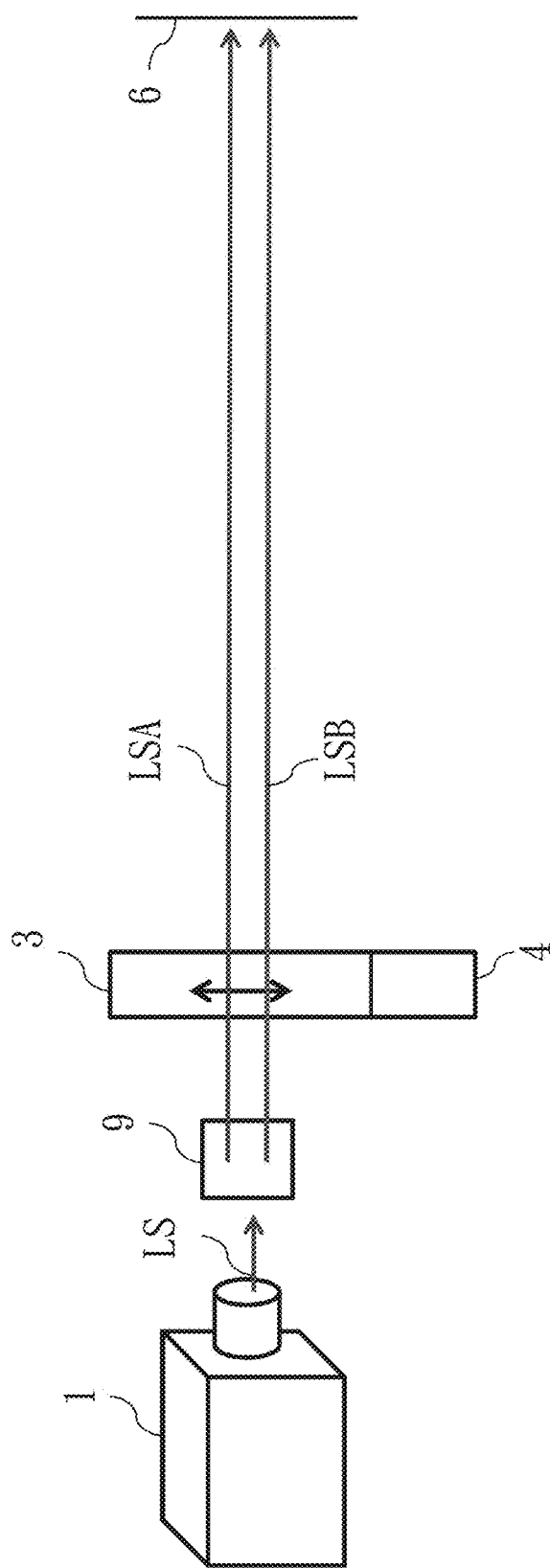
FIG. 7 is a schematic view of a partial random laser illumination system having a random phase and amplitude component in accordance with a sixth embodiment of the present invention.
Figure 8:
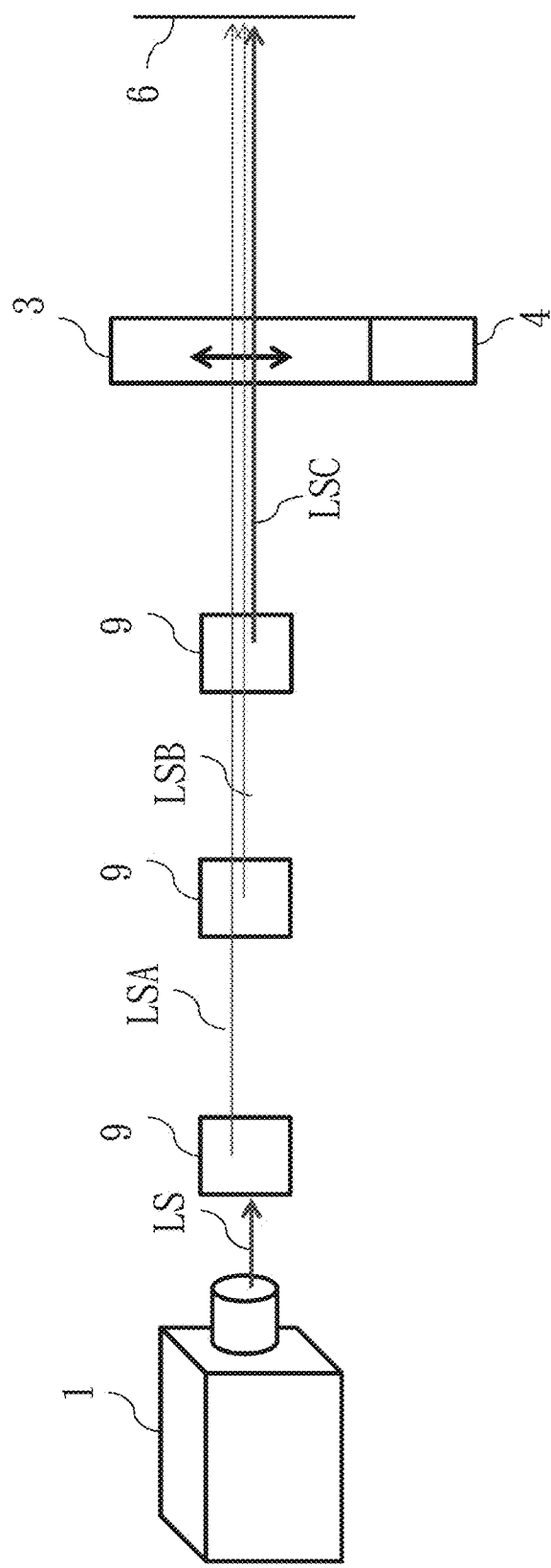
FIG. 8 is a schematic view of a partial random laser illumination system having a random phase and amplitude component in accordance with a seventh embodiment of the present invention.

Similarly, the laser illumination system according to the present invention may comprise one or more light conversion elements disposed beside the random phase and amplitude component to generate lasers of different wavelengths. FIG. 7 is a schematic view of a partial random laser illumination system having a random phase and amplitude component in accordance with a sixth embodiment of the present invention. As FIG. 7 shows, a light conversion element 9 is disposed between the laser illumination device 1 and the random phase and amplitude component 3, such that the laser beam LS emitted by the laser illumination device 1 passes through the light conversion element 9 to generate a laser beam LSA having a fundamental frequency and a laser beam LSB having a converted wavelength. Laser beams LSA and LSB have different wavelengths. When the laser beam LSA having a fundamental frequency and the laser beam LSB having a converted wavelength pass through the random phase and amplitude component 3, the speckles of the two laser beams will be reduced. FIG. 8 is a schematic view of a partial random laser illumination system having a random phase and amplitude component in accordance with a seventh embodiment of the present invention. As FIG. 8 shows, a plurality of light conversion elements 9 may be disposed between the laser illumination device 1 and the random phase and amplitude component 3, such that the laser beam LS generates lasers of different wavelengths after passing through the different light conversion elements 9. For example, the laser passes through the first light conversion element 9 and undergoes the first conversion; thereafter, a laser beam LSA having a fundamental frequency is obtained. Next, the laser passes through the second light conversion element 9 and undergoes the second conversion; thereafter, a laser beam LSB having a converted wavelength is obtained. Next, the laser passes through the third light conversion element 9 and undergoes the third conversion; thereafter, another laser beam LSC having a converted wavelength is obtained. The laser beams LSA, LSB, LSC are then emitted to the random phase and amplitude component 3, and the speckles of these laser beams will be reduced. Moreover, the plurality of light conversion elements 9 may also be disposed between the random phase and amplitude component 3 and the projection target 6, such that the laser beam LS passes through the random phase and amplitude component 3 first before passing through the light conversion elements 9. The resulted laser beams with various wavelengths can also undergo the speckle reduction.

Figure 9:
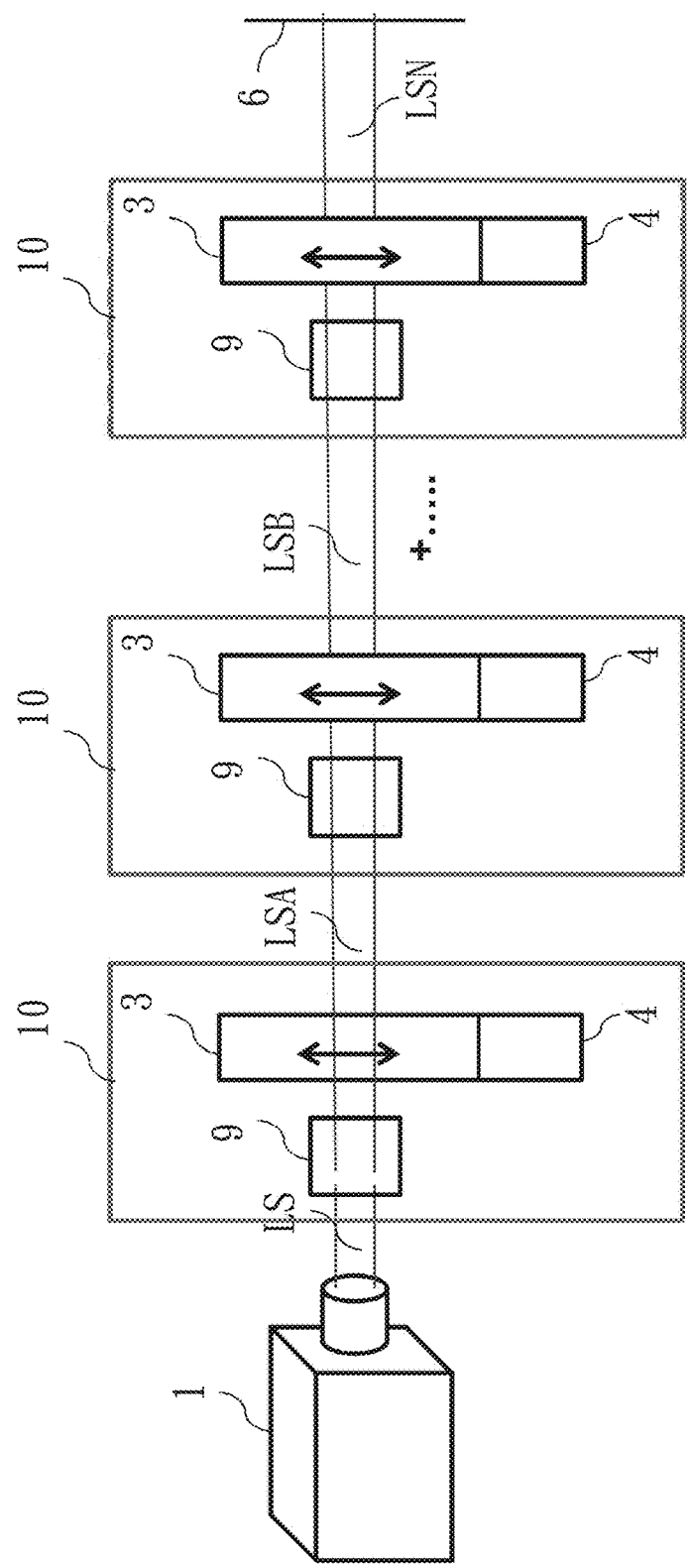
FIG. 9 is a schematic view of another example of a partial random laser illumination system having a random phase and amplitude component in accordance with a seventh embodiment of the present invention.

FIG. 9 is a schematic view of a partial random laser illumination system having a random phase and amplitude component in accordance with a seventh embodiment of the present invention. As FIG. 9 shows, the laser illumination system according to the present invention may further comprise a plurality of light conversion modules 10; each light conversion module 10 comprises a random phase and amplitude component 3 and a light conversion element 9. The plurality of the light conversion modules 10 are disposed between the laser illumination device 1 and the projection target 6, and are passed through by the laser beam LS. When the laser beam LS passes through the first light conversion module 10, the first and second partial random phase lasers are generated. When the laser beam LS passes through the second light conversion module 10, the third, fourth, and fifth partial random lasers are generated. That is, when the laser beam LS passes through the Nth light conversion module 10, 2+N(N+1)/2 partial random lasers will be generated. Preferably, each light conversion module 10 further comprises a VCM 4 vibrating the random phase and amplitude component 3 back and forth to enhance speckle reduction. In addition, in all of the above-described embodiments, part of the random laser beam may preferably be reflected from the random phase and amplitude component 3 back to the laser illumination device 1, so as to disturb the phase and amplitude distribution of the laser source in temporal and spatial coordinates. By doing so, the highly coherent laser source can be output as the partial random laser beam that achieves speckle reduction.

Figure 10:
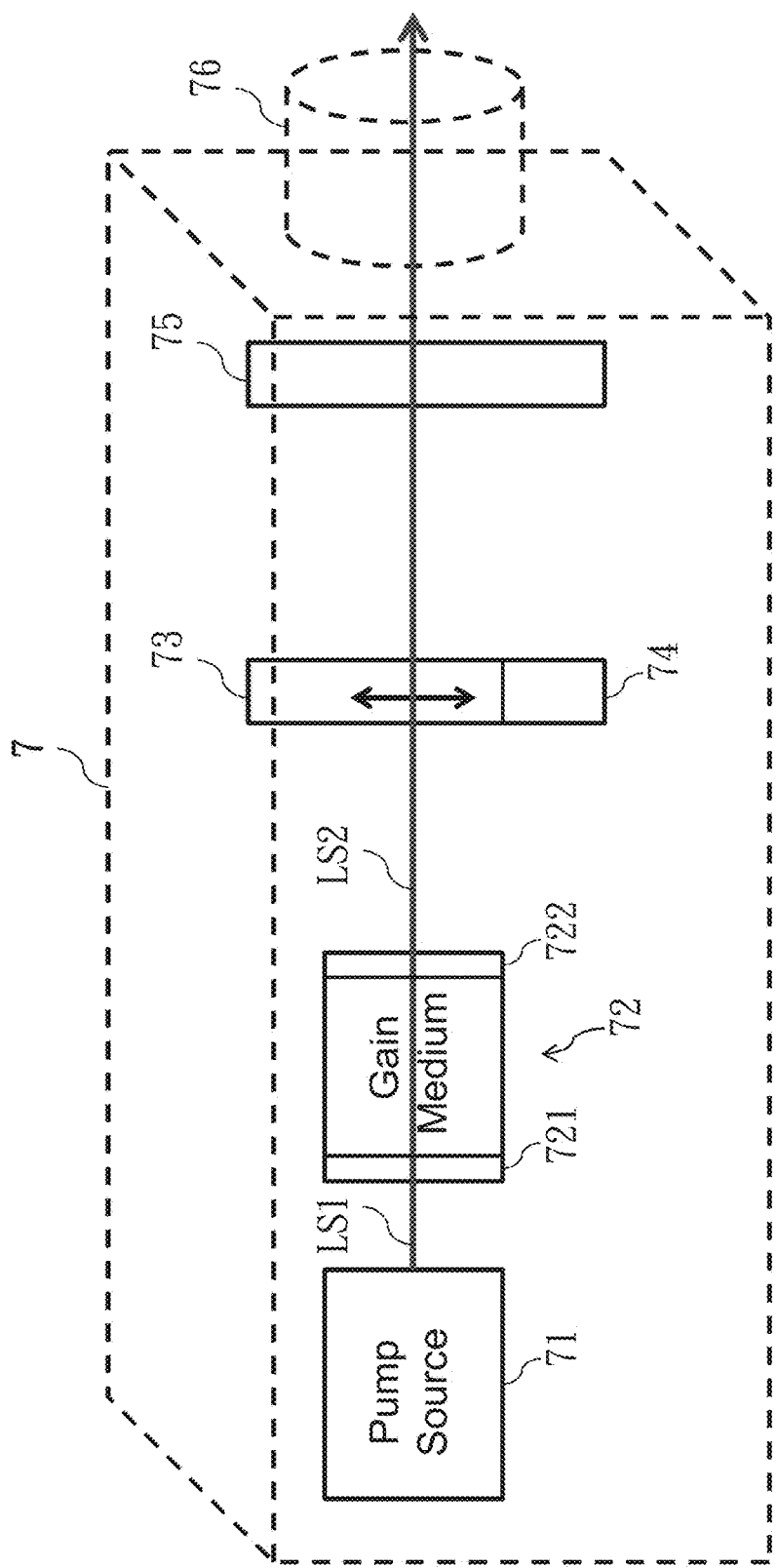
FIG. 10 is a schematic view showing the internal construction of a partial random laser illumination device having a random phase and amplitude component in accordance with an eighth embodiment of the present invention.

FIG. 10 is a schematic view showing the internal construction of a partial random laser illumination device having a random phase and amplitude component in accordance with an eighth embodiment of the present invention. The laser illumination device shown in FIG. 10 represents another embodiment of the present invention. The laser illumination systems described above comprise an external-cavity speckle reduction component, but the laser illumination device shown in FIG. 10 has an intra-cavity speckle reduction component, meaning that the random phase and amplitude component 3 is provided internally within the partial random laser illumination device. Similar to the process described above with respect to the laser illumination system having an external-cavity random phase and amplitude component, in this laser illumination device, the light source is amplified within the resonant cavity at least once, passes through the random phase and amplitude component at least once, and then exits the resonant cavity as the laser beam. Because of the resonance phenomena occurring in the resonant cavity, the mechanism for generating partial random laser source within the cavity is different from that of the external-cavity partial random laser system. The phase and amplitude distribution of the partial random laser along the spatial axis and temporal axis is also different due to the resonance. As FIG. 10 shows, a speckle-suppressed laser illumination device 7 comprises a pump source 71, a gain medium 72, a random phase and amplitude component 73, and a highly reflective mirror 75. Energy provided by the pump source 71 excites electrons to be elevated from a low energy level to a high energy level. The light beam LS1 before amplification is then emitted to the gain medium 72 to pass through it; the light beam LS1 thus becomes the amplified laser beam LS2 after passing through the gain medium 72. The gain medium 72 has a highly-reflective surface 721 with good reflective properties, and an anti-reflective surface 722 which has no reflective properties. The pump source 71 emits the light beam LS1 to the highly-reflective surface 721. The light beam is then reflected for several times and amplified by the gain medium 72; thereafter, the light beam is emitted from the anti-reflective surface 722 as the amplified laser beam LS2. The pump source 71 may be replaced with other semiconductor lasers or injection of electrons and holes. The pump source 71 may also be an electrical, optical, or chemical pumping element.

The amplified laser beam LS2 emitted from the anti-reflective surface 722 then passes through the random phase and amplitude component 73 and the highly reflective mirror 75. Finally, the amplified laser beam LS2, the speckle of which has been reduced, is output through an emission port 76 and emitted toward the outside of the laser illumination device 7. In the device 7, the random phase and amplitude component 73 is disposed between the gain medium 72 and the highly reflective mirror 75, and is passed through by the amplified laser beam LS2. Preferably, the random phase and amplitude component 73 is of a phase-only type or a scattering type. The random phase and amplitude component 73 may form a small angle of near ±0 to near ±5 degrees with the direction perpendicular to the laser beam LS2. (The random phase and amplitude component 73 may have a small angle of near ±0 to near ±5 degrees (relative to the perpendicular direction of the laser beam LS2) The angle may even be extended to near ±90 degrees, and the angle will have different speckle reduction performances at different degrees. The light beam LS1 before amplification emitted by the pump source 71 (which may be a laser diode) sequentially passes through the gain medium 72, the random phase and amplitude component 73 and the highly reflective mirror 75, and is finally emitted through the emission port 76 toward the outside of the speckle-suppressed laser illumination device 7. As such, by means of the random phase and amplitude component 73, the speckle noise of the laser beam can be effectively reduced. Compared with prior art laser illumination devices, the laser illumination device according to the present invention can reduce laser speckle noise more effectively.

To achieve more noticeable results, it is preferable that a VCM 74 is used to vibrate the random phase and amplitude component 73 of the present invention. The vibrating direction is substantially perpendicular to the amplified laser beam LS2. Moreover, a person of ordinary skill in the art should understand that although the VCM 74 is used as a vibrating component in this embodiment, other components that can achieve the same or similar vibrating results as the VCM 74 may be used in practice. The use of the VCM 74 here is exemplary and is not intended to limit the present invention. The speckle reduction results of the VCM 74 have been described above with reference to FIG. 2 and will not be repeated here. In addition, part of the random laser beam may preferably be reflected from the random phase and amplitude component 73 back to the laser illumination gain medium 72, so as to disturb the phase and amplitude distribution of the laser in temporal and spatial coordinates. By doing so, the speckle reduction performance is further improved.

Figure 11:
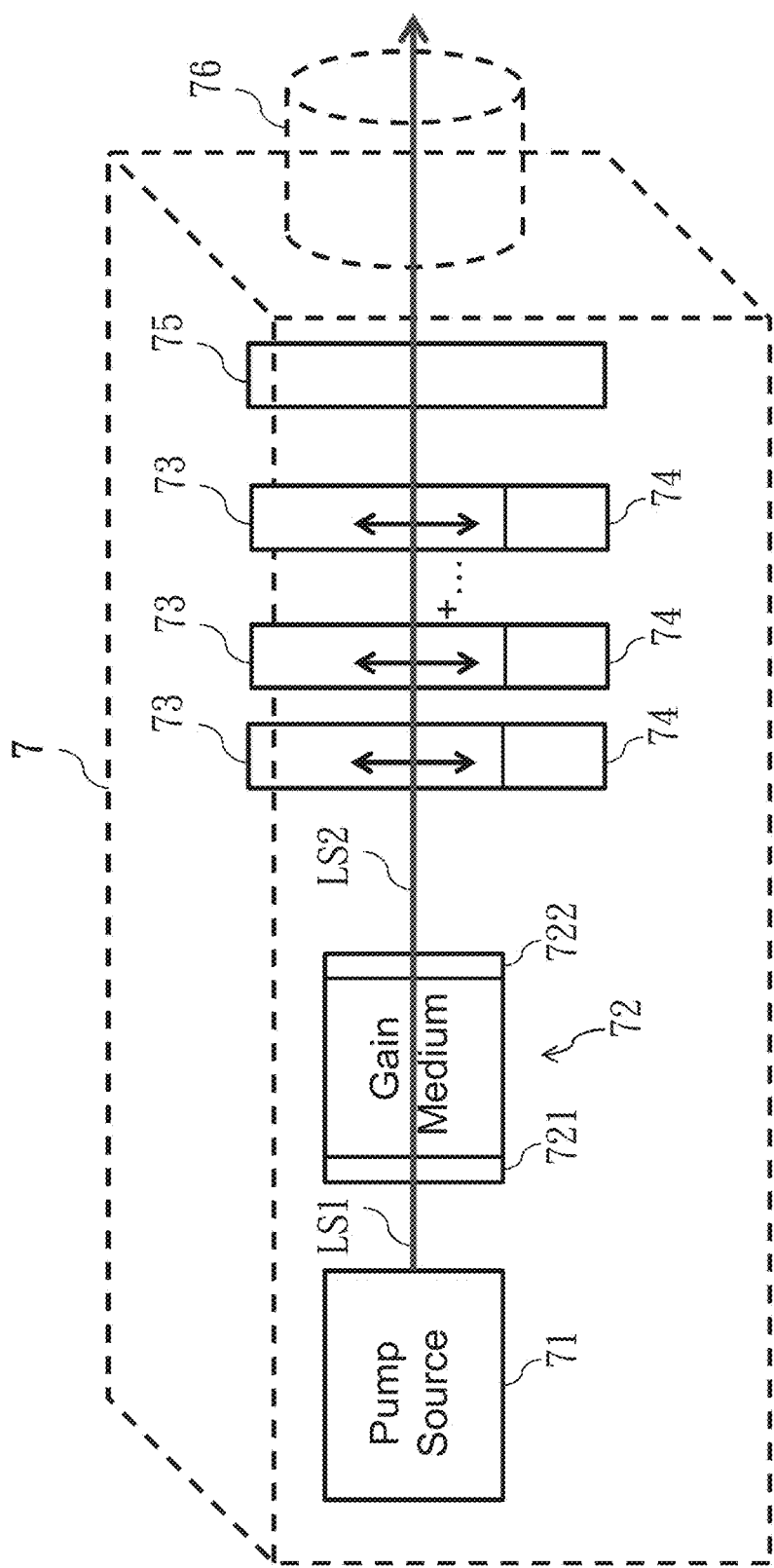
FIG. 11 is a schematic view showing the internal construction of a partial random laser illumination device having a random phase and amplitude component in accordance with a ninth embodiment of the present invention.

FIG. 11 is a schematic view showing the internal construction of a partial random laser illumination device having a random phase and amplitude component in accordance with a ninth embodiment of the present invention. As FIG. 11 shows, the device may comprise a plurality of random phase and amplitude components 73 disposed between the gain medium 72 and the highly reflective mirror 75 (or in other words, extra random phase and amplitude components are disposed between the existing random phase and amplitude component and the highly reflective mirror 75). The laser beam LS2 can pass through the plurality of random phase and amplitude components, and the speckle reduction performance of the device is considerably improved. The principle of operation is similar to that described above for FIG. 5 and the fourth embodiment. The laser illumination device may also comprise VCMs 74 arranged for vibrating each of the random phase and amplitude component 73 to enhance speckle reduction.

Figure 12:
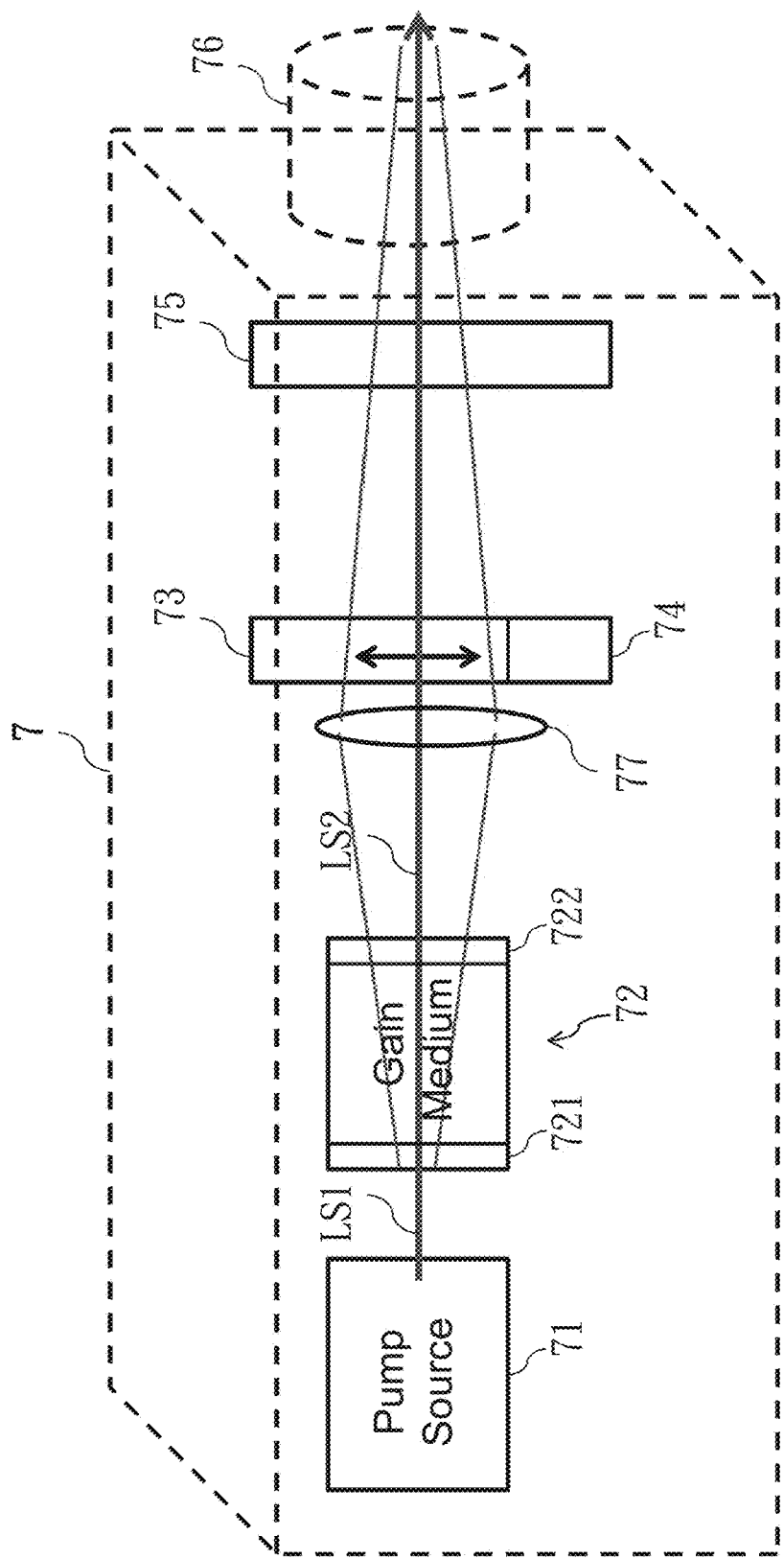
FIG. 12 is a schematic view showing the internal construction of a partial random laser illumination device having a random phase and amplitude component in accordance with a tenth embodiment of the present invention.

FIG. 12 is a schematic view showing the internal construction of a partial random laser illumination device having a random phase and amplitude component in accordance with a tenth embodiment of the present invention. As FIG. 12 shows, a converging lens 77 is disposed between the gain medium 72 and the random phase and amplitude component 73, such that the amplified laser beam LS2 passes through the converging lens 77. The area of light entering the random phase and amplitude component can be increased. Thus, the speckle reduction results will be further improved, and a convergent point light source may be obtained.

Figure 13:
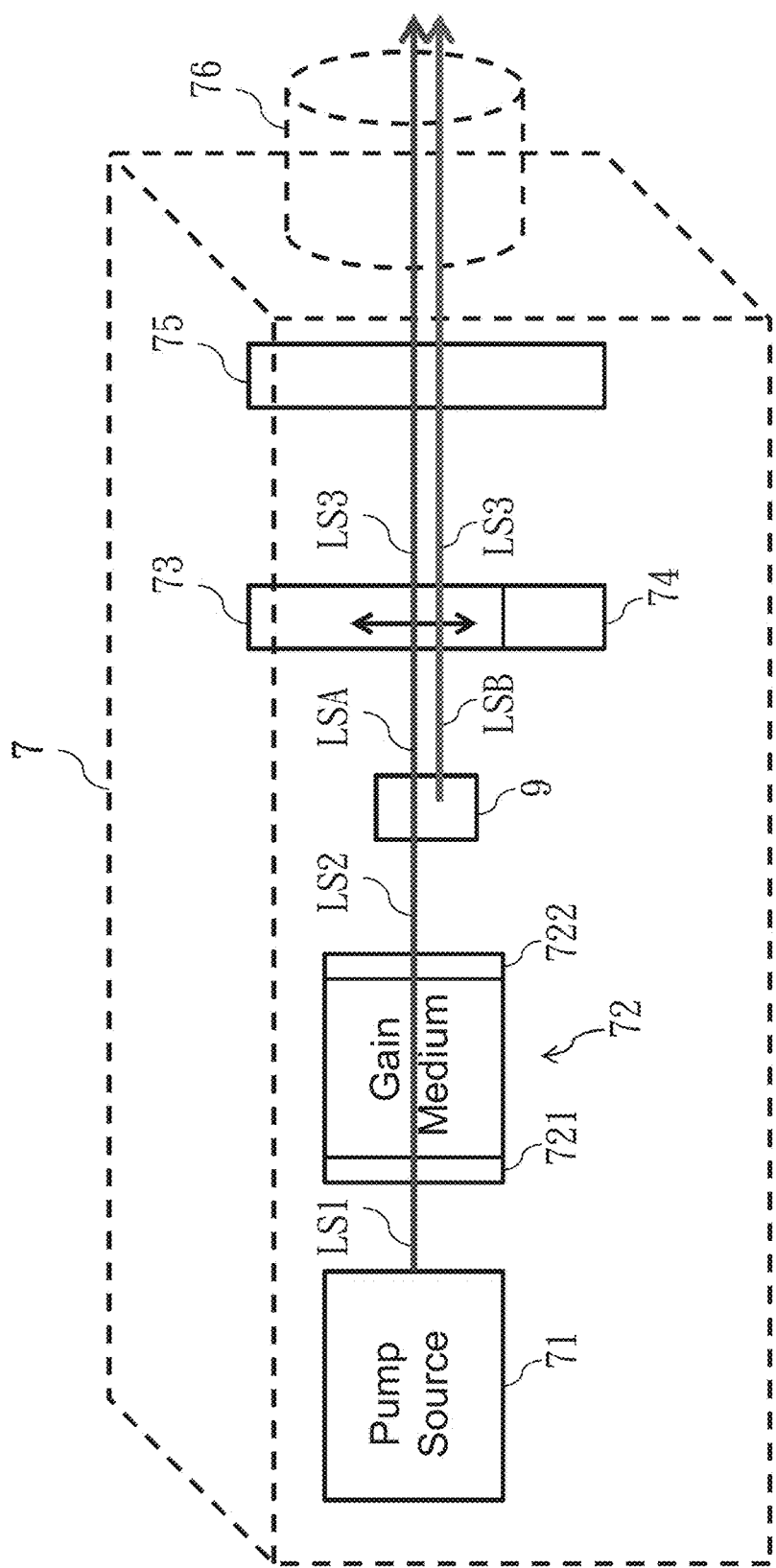
FIG. 13 is a schematic view showing the internal construction of a partial random laser illumination device having a random phase and amplitude component in accordance with a eleventh embodiment of the present invention, where a nonlinear crystal or light conversion element is added to the device.

It should be noted that, a major feature of the present invention is that even if the random phase and amplitude component is provided internally within the laser illumination device, conventional properties of lasers are still retained, such as properties related to narrow line width, Gaussian beam propagation, capability of being well focused, small divergence angle, long distance illumination, etc. Furthermore, the conventional laser properties can be retained if light conversion elements are added between the gain medium 72 and the random phase and amplitude component 73, wherein the light conversion elements are preferably nonlinear or linear elements. FIG. 13 is a schematic view showing the internal construction of a partial random laser illumination device having a random phase and amplitude component in accordance with an eleventh embodiment of the present invention, in which a light conversion element is added to the device. As FIG. 13 shows, a light conversion element 9 is added between the gain medium 72 and the random phase and amplitude component 73. The amplified laser beam LS2 emitted by the gain medium 72 passes through the light conversion element 9 and becomes the laser beam LS3. Preferably, the light conversion element 9 may be one of a frequency doubling element, a sum-frequency generation element, a difference-frequency generation element, or other conversion elements, such that the frequency/wavelength of the laser beam LS3 is changed after passing through the light conversion element. In this way, the speckle reduction technique of the present invention may be applied for use with different types of lasers, such as infrared laser, visible-light laser, etc., to achieve speckle reduction results. The light conversion element is preferably a KTiOPO4 crystal, MgO:LiNbO3 crystal, MgO:LiTaO3 crystal, BBO crystal, or other crystals with high conversion efficiency.

Figure 14:
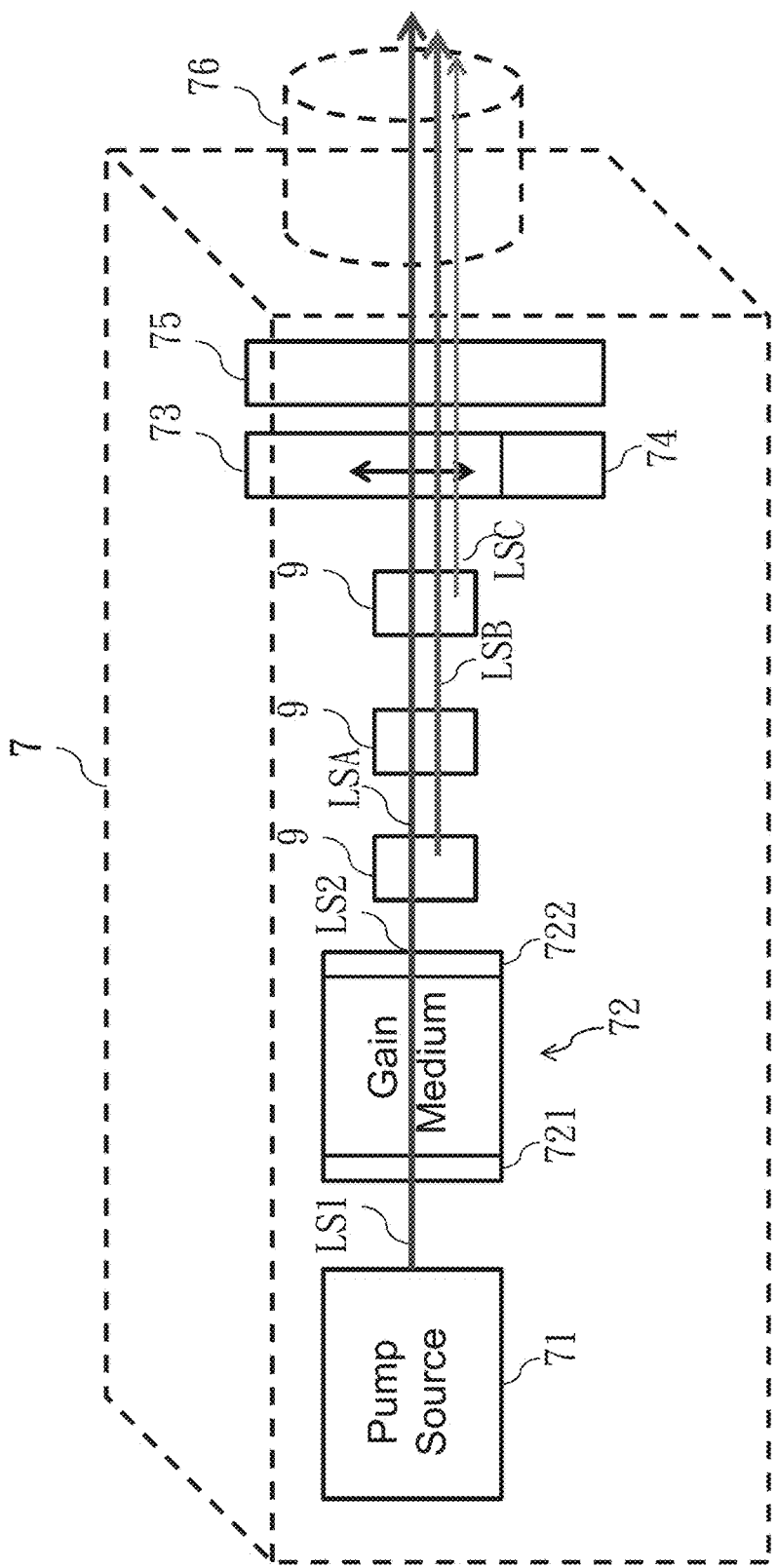
FIG. 14 is a schematic view showing the internal construction of a partial random laser illumination device having a random phase and amplitude component in accordance with a twelfth embodiment of the present invention.

FIG. 14 is a schematic view showing the internal construction of a partial random laser illumination device having a random phase and amplitude component in accordance with a twelfth embodiment of the present invention. As FIG. 14 shows, a plurality of light conversion elements 9 may be disposed between the gain medium 72 and the random phase and amplitude component 73. Through the light conversion elements 9, the amplified laser beam LS2 is converted; a laser beam LSA having a fundamental frequency and laser beams LSB, LSC having a converted wavelength are thus generated. Accordingly, the speckles of the laser beams LSA, LSB, and LSC can be reduced by the random phase and amplitude component 73.

Figure 15:
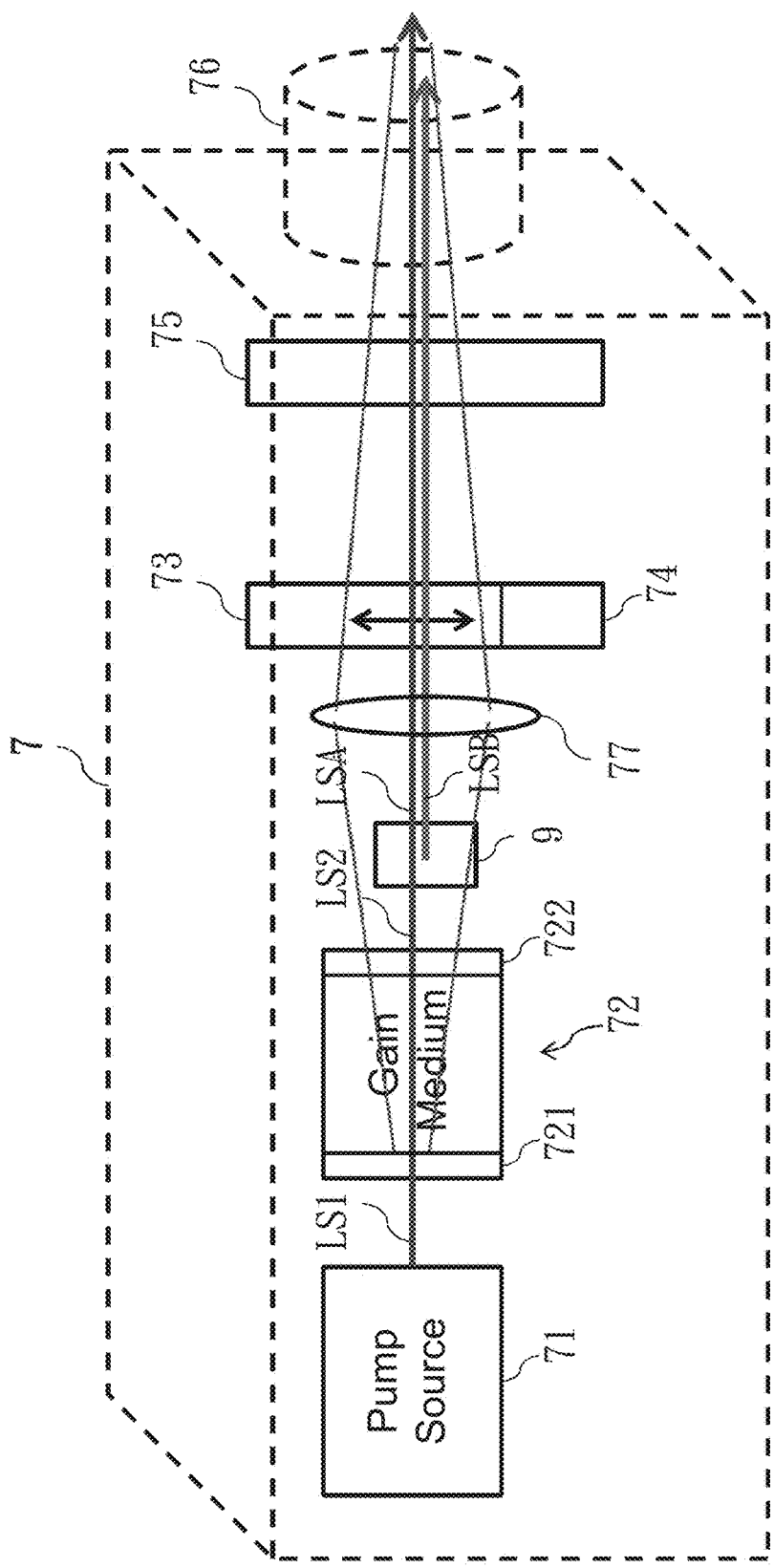
FIG. 15 is a schematic view showing the internal construction of a partial random laser illumination device having a random phase and amplitude component in accordance with a thirteenth embodiment of the present invention.

FIG. 15 is a schematic view showing the internal construction of a partial random laser illumination device having a random phase and amplitude component in accordance with a thirteenth embodiment of the present invention. As FIG. 15 shows, a converging lens 77 is disposed between the light conversion element 9 and the random phase and amplitude component 73, such that the amplified laser beam LS2 passes through the converging lens 77. The area of light entering the random phase and amplitude component can be increased. Thus, the speckle reduction results will be further improved, and a convergent point light source may be obtained.

Additionally, in the embodiments described above, there may also be a diffuser, a diffractive optical element (DOE), or a microlens disposed within the resonant cavity (i.e., between the gain medium 72 and the random phase and amplitude component 73), so as to reduce the speckles for both the light source having a fundamental frequency and the converted light sources simultaneously.

Moreover, the above-described partial random laser illumination device having a random phase and amplitude component may be applied to a laser illumination system. For example, a random phase and amplitude component may be disposed between a partial random laser illumination device (the device as in any of the eighth to thirteenth embodiments) and a projection target, such that the emitted laser beam passes through the random phase and amplitude component. In this way, the phase and amplitude of the partial random laser are distributed along the temporal axis and the spatial axis; the speckle of the laser is also reduced. And through the linear or nonlinear conversion, a novel partial random laser with converted light is obtained. The speckle of the resulted partial random laser is reduced. In another example, a laser illumination system comprising the partial random laser illumination device further comprises one or more light conversion elements. By means of the one or more light conversion elements, a plurality of partial random lasers become novel partial random laser sources with converted wavelengths. The speckles of the resulted partial random laser sources are reduced, with the speckle reduction performance improved.

Figure 16:
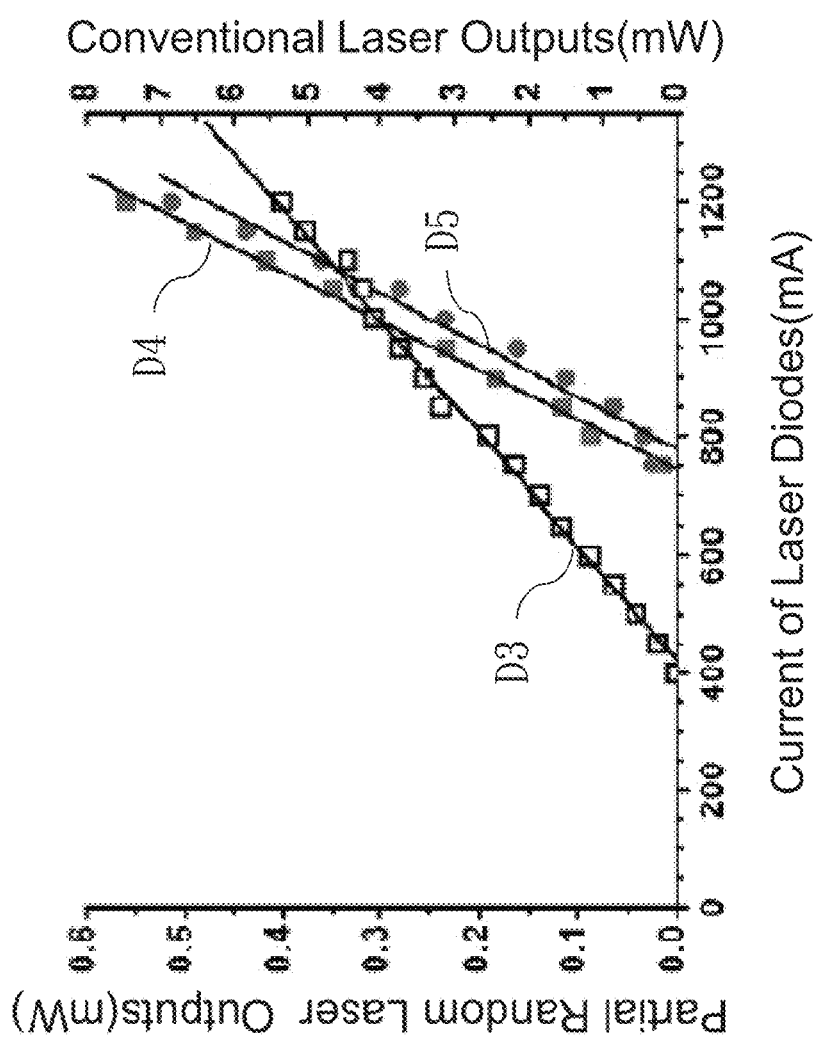
FIG. 16 is a diagram showing the properties of the laser beams output by a partial random laser illumination device having a random phase and amplitude component in accordance with the present invention.

FIG. 16 shows the properties of the laser beams output by the laser illumination device having a random phase and amplitude component according to the present invention. In this figure, the curve D3 represents the results generated by a conventional laser illumination device without a random phase and amplitude component; the curve D4 represents those by a laser illumination device having a static (not being vibrated) random phase and amplitude component; and the curve D5 represents those by a laser illumination device having a random phase and amplitude component vibrated back and forth by a VCM at a frequency of 130 Hz. Please refer to the Y-axis on the right-hand side for the laser output in relation to the curve D3 (the conventional laser), and the Y-axis on the left-hand side for the laser outputs in relation to the curves D4 and D5 (the partial random laser). It can be seen from FIG. 16 that, whether a VCM is provided in the laser illumination device or not, the output laser beam can still retain the good properties of laser. That is to say, the laser beam can maintain a small divergence angle after passing through the random phase and amplitude component. Therefore, it is easy to control the shaping of the laser beams. The beam divergence angle of the laser illumination device will not become too large to affect the original laser properties.

Figure 17:
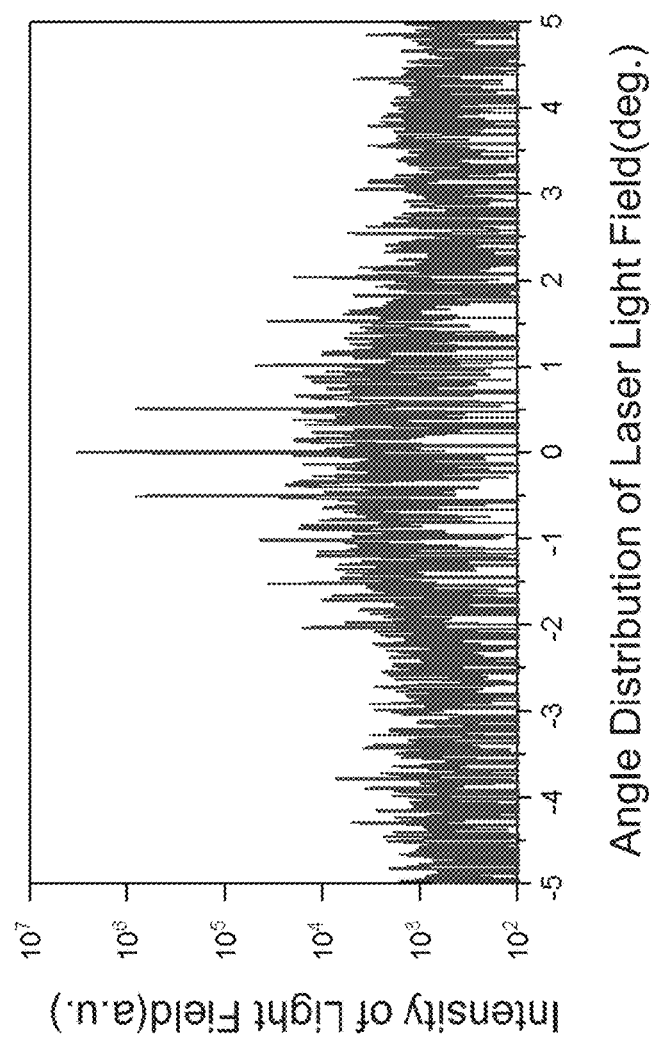
FIG. 17 is a schematic diagram showing the far-field distribution of the laser beam after passing through the random phase and amplitude component in accordance with the present invention.

A feature may be designed into an optical element so that the phase and amplitude distribution of a laser source in spatial and temporal coordinates will be rearranged after passing through the random phase and amplitude component. Take a random phase and amplitude diffuser for example, the distribution of the designed pattern on the structure may be periodic, partially periodic, random, or combinations thereof. The structure size of the designed pattern on the random phase and amplitude component may be range from nanoscale to micron-scale; it may be range from a scale smaller than 10 um to a scale greater than 150 um or smaller structure size than 10 um or larger structure size than 150 um. FIG. 17 shows the far-field distribution of the laser beam after passing through the random phase and amplitude component, which has a pattern of about 10 um to about 150 um on the structure. The divergence angle of the laser beam is smaller than ±0.5 degree, and the amplitude is re-distributed along the spatial axis. When the laser beam passes through the random phase and amplitude component, at least one of the optical interactions including interference, refraction, diffraction, scattering, diffusion, etc., will occur. Thereafter, the phase and amplitude will undergo re-distribution along the spatial and temporal axes. The scale of the pattern on the structure of the random phase and amplitude component can be adjusted depending on the properties and needs of the partial random laser source to satisfy the different needs for beam divergence angle and speckle reduction.

Moreover, the laser source generated by the partial random laser illumination system/device according to the present invention has the following features: a) It may be partially temporally coherent, or partially temporally incoherent. b) It may be partially spatially coherent, or partially spatially incoherent. c) The speckle reduction performance is spatially and temporally uniform when projected to a smooth or rough surface. d) Its spatial distribution of average energy/intensity may be highly uniform. e) Its spatial distribution of average energy/intensity may be highly non-uniform. f) Its spatial distribution of instantaneous energy/intensity may be highly uniform. g) Its spatial distribution of instantaneous energy/intensity may be highly non-uniform. h) It may have the averaging propagation properties of a Gaussian beam. e) It may have the averaging propagation properties of a non-Gaussian beam. j) It may have a narrow or wide linewidth. k) It may have a small angle when projected to a target, and may be highly collimated. l) It may have a wide angle when projected to a target and may create a large projection area. m) It may generally have a averaging small size when being focused. n) It may generally have a averaging large size when being diverged. o) It may be a continuous-wave laser. p) It may be a quasi-continuous-wave laser. q) It may be a pulse-wave laser.

In sum, by arranging a random phase and amplitude component directly in a laser illumination device, the output laser beam is speckle-suppressed and extra speckle reduction devices are not required. Further, the present invention may output visible-light lasers by disposing nonlinear or linear elements in a near-infrared laser cavity. And by vibrating the random phase and amplitude component, the speckle noise can be reduced for both the light of a fundamental frequency and light with a converted wavelength. The speckle suppression technique of the present invention may be further used in higher harmonic conversion applications. When the partial random laser according to the present invention is used for large-angle focusing, the focused laser spot can be small-sized. The laser spot may be of wavelength scale, half-wavelength scale, or smaller.

To conclude, a partial random laser illumination system/device having a random phase and amplitude component according to the present invention can reduce the speckle noise effectively while retaining the laser beam properties. Also, the laser beam divergence angle may be a small one or a large one; this allows the laser beam to achieve long distance illumination (e.g., for a distance of several meters or kilometers). The present invention can be applied for use in LCOS, DLP, and micro-electro-mechanical systems that require small laser light spots, or other scanning projection systems.

The embodiments depicted above and the appended drawings are exemplary and are not intended to limit the scope of the present invention. All modifications or alterations that have equivalent functions and are made without departing from the spirit and scope of the present invention fall within the scope of the appended claims.

What is claimed is:

1. A partial random laser illumination device having a resonant cavity with an output side from which an amplified laser beam is emitted, the resonant cavity comprising:
   a gain medium having an output side from which an amplified laser beam is emitted;
   a pump source configured for exciting electrons in the gain medium from a low energy level to a high energy level;
   a highly reflective mirror disposed at a position on the output side of the resonant cavity, and
   a random phase and amplitude component disposed between the gain medium and the highly reflective mirror and through which the amplified laser beam emitted from the gain medium passes, wherein the random phase and amplitude component is configured to vibrate in a vibrating direction that is substantially perpendicular to the amplified laser beam or that defines an angle of 0-45 degrees with respect to the emitting direction of the amplified laser beam.

2. The partial random laser illumination device according to claim 1, wherein the random phase and amplitude component is one of a phase-only random phase and amplitude component, a scattering random phase and amplitude component, or a combination thereof, and wherein the random phase and amplitude component is one of a diffuser, a diffractive optical element, a microlens, and/or combinations thereof.

3. The partial random laser illumination device according to claim 1, further comprising a vibrating component for vibrating the random phase and amplitude component back and forth along said vibrating direction.

4. The partial random laser illumination device according to claim 3, wherein the vibrating component is selected from one of a voice coil motor, a magnetically driven element, an electrically driven element, a light-driven element, a sound-driven element, a piezoelectric element, and/or combinations thereof.

5. The partial random laser illumination device according to claim 1, wherein the gain medium has a highly-reflective surface and an anti-reflective surface, the pump source emitting pump light into the highly-reflective surface, the amplified laser beam being emitted from the anti-reflective surface.

6. The partial random laser illumination device according to claim 1, further comprising one or more light conversion elements disposed between the gain medium and the random phase and amplitude component, such that the one or more light conversion elements are passed through by the amplified laser beam emitted by the gain medium.

7. The partial random laser illumination device according to claim 6, further comprising a converging lens disposed between the one or more light conversion elements and the random phase and amplitude component, such that the laser beam passes through the converging lens.

8. The partial random laser illumination device according to claim 6, wherein the light conversion element is selected from a linear element and/or a nonlinear element, and wherein the light conversion element is one of a frequency doubling element, a sum-frequency generation element, a difference-frequency generation element, and/or other conversion elements.

9. The partial random laser illumination device according to claim 1, wherein a direction to the passed laser beam to the random phase and amplitude component and a perpendicular direction to the amplified laser beam forms an angle of near ±0 to near ±90 degrees, the angle is one of the divergence angle, convergence angle, diffusion angle, scattering angle, diffraction angle, interference angle, the intersection angle and/or combinations thereof.

10. The partial random laser illumination device according to claim 1, further comprising one or more extra random phase and amplitude components disposed between the gain medium and the highly reflective mirror, such that the laser beam passes through the one or more extra random phase and amplitude components.

11. The partial random laser illumination device according to claim 1, further comprising a converging lens disposed between the gain medium and the random phase and amplitude component, such that the laser beam passes through the converging lens.

12. The partial random laser illumination device according to claim 1, wherein the random phase and amplitude component reflects part of the amplified laser beam to the gain medium.

* * * * *